United States Patent [19]
Bender et al.

[11] Patent Number: 5,868,641
[45] Date of Patent: Feb. 9, 1999

[54] MOTOR VEHICLE CHANGE GEAR UNIT WITH REDUCED GEAR WHEEL STAGES

[75] Inventors: Helmut Bender, Pleidelsheim; Guenter Ruehle, Loechgau; Henning Diel, Ludwigsburg, all of Germany

[73] Assignee: MC Micro Compact Car AG, Switzerland

[21] Appl. No.: 831,291

[22] Filed: Mar. 31, 1997

[30] Foreign Application Priority Data

Mar. 29, 1996 [DE] Germany .................. 196 12 690.8

[51] Int. Cl.$^6$ .................................. B60K 17/08
[52] U.S. Cl. ........................................... 475/203
[58] Field of Search .................. 74/325, 337.5, 74/606 R; 475/200, 203, 206

[56] References Cited

U.S. PATENT DOCUMENTS

| | | |
|---|---|---|
| 5,224,393 | 7/1993 | Ashikawa et al. . |
| 5,333,512 | 8/1994 | Pruss et al. .................. 74/325 |
| 5,718,148 | 2/1998 | Bender .................... 475/203 |
| 5,724,856 | 3/1998 | Back .................... 74/337.5 |

FOREIGN PATENT DOCUMENTS

| | | |
|---|---|---|
| 0 242 338 B1 | 10/1987 | European Pat. Off. . |
| 2 516 457 | 11/1982 | France . |
| 30 37 990 A1 | 5/1982 | Germany . |
| 39 26 570 A1 | 2/1991 | Germany . |
| 41 26 161 C2 | 2/1992 | Germany . |
| 40 31 571 A1 | 4/1992 | Germany . |
| 42 26 576 A1 | 2/1994 | Germany . |
| 205282 | 9/1939 | Switzerland . |

*Primary Examiner*—Dirk Wright
*Attorney, Agent, or Firm*—Evenson, McKeown, Edwards & Lenahan, P.L.L.C.

[57] ABSTRACT

A change gear unit has an output shaft which can be engaged into a drive connection with a parallel input shaft. The output shaft can be engaged into the drive connection by at least three gear wheel stages in order to form forward gears. Also, the output shaft can be engaged with a vehicle axle differential gear unit by two gear wheel stages. The differential gear unit has output shafts that are parallel with respect to the central axis of the change gear unit.

17 Claims, 7 Drawing Sheets

FIG.1

|     | 42  |     | 31  |     | 26  |     |
| --- | --- | --- | --- | --- | --- | --- |
|     | 37  | 38  | 39  | 40  | 27  | 34  |
| V   |     |     | X   |     | X   |     |
| IV  |     | X   |     |     | X   |     |
| III | X   |     |     |     | X   |     |
| II  |     |     | X   |     |     | X   |
| I   | X   |     |     |     |     | X   |
| R   |     |     |     | X   |     | X   |

FIG.2

|     | 42  |     | 31  |     | 26  |     |
| --- | --- | --- | --- | --- | --- | --- |
|     | 37  | 38  | 39  | 40  | 27  | 34  |
| VI  |     |     | X   |     | X   |     |
| V   |     | X   |     |     | X   |     |
| IV  | X   |     |     |     | X   |     |
| III |     |     | X   |     |     | X   |
| II  |     | X   |     |     |     | X   |
| I   | X   |     |     |     |     | X   |
| R   |     |     |     | X   |     | X   |

|  | 42 | | 31 | | 32 | 26 | |
|---|---|---|---|---|---|---|---|
|  | 37 | 38 | 39 | 40 | 30 | 27 | 34 |
| VII | | | | | | X | (X) |
| VI | | | X | | | X | |
| V | | X | | | | X | |
| IV | X | | | | | X | |
| III | | | X | | | | X |
| II | | X | | | | | X |
| I | X | | | | | | X |
| R | | | | X | | | X |

FIG.7A

|  | 42 | | 31 | | 32 | 26 | |
|---|---|---|---|---|---|---|---|
|  | 37 | 38 | 39 | 40 | 49 | 27 | 34 |
| VII | | | X | | | X | |
| VI | | X | | | | X | |
| V | X | | | | | X | |
| IV | | | X | | | | X |
| III | | X | | | | | X |
| II | X | | | | | | X |
| I | | | | | X | | X |
| R | | | | X | | | X |

FIG.8A

MOTOR VEHICLE CHANGE GEAR UNIT WITH REDUCED GEAR WHEEL STAGES

BACKGROUND AND SUMMARY OF THE INVENTION

The present invention relates to a change gear unit, and more particularly, to a motor vehicle change gear unit in which an output shaft can, in each case, be moved optionally into a drive connection with a parallel input shaft, by at least three gear wheel stages to form forward gears and by one gear wheel stage to form a reverse gear. An input-side gear unit element of a three-element differential gear unit of the planetary gear type is arranged, with the central axis of the said gear unit element, parallel to the input shaft and output shaft, by way of two gear wheel stages, and the two output-side gear unit elements of the differential gear unit which are centrally arranged to the central axis can each be coupled to a vehicle wheel of a drive axle.

More specifically in the change gear unit the two input-side gear wheels of two gear wheel stages which are used to form forward gears as a drive connection between the input shaft and the output shaft, and the input-side gear wheel of the gear wheel stage which is used to form the reverse gear as a drive connection between the input shaft and output shaft are each arranged rotationally fixed relative to the input shaft. An intermediate gear wheel which is independently rotatably mounted can be moved into meshing engagement both with the input-side and with the output-side gear wheel of the gear wheel stage which is used to form the reverse gear as a drive connection between the input shaft and output shaft.

In a known change gear unit as described in EP 0 242 338 B1, two gear wheel stages are used to form forward gears and one gear wheel stage is used to form a reverse gear, in each case as a drive connection between the input shaft and output shaft. A clutch sliding sleeve is arranged axially displaceably and rotationally fixed with respect to the output shaft, for optionally engaging the two gear wheel stages in order to form forward gears. The sliding sleeve is additionally provided with continuous toothing for use as an output-side gear wheel of the gear wheel stage in order to form the reverse gear. This gear wheel stage acts as a drive connection in that the sliding sleeve is moved into its axial neutral position and the intermediate gear wheel is then pushed into the continuous toothings of the gear-shift sliding sleeve and of the associated input-side gear wheel on the input shaft. Synchronization of the reverse gear is thus not provided.

In the known change gear unit, the output shaft can be moved into a drive connection with the differential gear unit by two gear wheel stages which can be optionally engaged. In total, thereby, four forward gears are obtained in conjunction with the two other gear wheel stages.

In the known change gear unit, the objective was to reduce the gear wheel stages in comparison with a four-gear change gear unit in which one gear wheel stage is provided for each forward gear, i.e. a total of four gear wheel stages, between the input shaft and output shaft. The two input-side gear wheels of the forward-gear gear wheel stages were keyed onto the input shaft. It was also known that a third gear wheel stage might form forward gears as a drive connection between the input shaft and output shaft so that a six-speed gear unit is obtained, but the way to obtain a six-speed gear unit has not been described in the prior art.

In the change gear unit described in CH-PS 205 282, the input-side gear wheels of the gear wheel stages, which are used to form the forward gears II to V as a drive connection between the input shaft and output shaft are rotatably seated, as loose wheels, on the input shaft, in order to form the lowest forward gear I and the reverse gear. In each case, a particular input gear wheel arranged rotationally fixed on the input shaft and a common output gear wheel having three crown gears and seated loosely on the output shaft as a sliding gear wheel were provided for the gear wheel stages. One of the three crown gears was optionally moved into a meshing engagement with the associated input gear wheels. One of the two other crown gears was in a meshing engagement with one and the same gear wheel assigned to the differential gear unit and at the same time arranged concentrically with respect to its central axis and fixed in terms of movement with respect to its input-side gear unit element. The output gear wheel with the three crown gears and the output gear wheel which was associated with the gear wheel stage in order to form the forward gear V with the lowest transmission ratio were arranged both at opposite ends of the output shaft and in change gear unit casing chambers separated from one another by an intermediate casing wall.

In another known change gear unit as described in DE 30 37 990 A1, two input shafts, which are concentric with respect to one another, are movable into a drive connection with a parallel output shaft by, on one hand, one power shift clutch with a drive motor and, on the other hand, by gear wheel stages, in order to form forward gears and one reverse gear. The gear wheel stages and their shifting apparatuses were activated using a shift drum which is driven by an electric motor.

Finally, yet another change gear unit was described in DE 41 26 161 C2. The axes of rotation of one input shaft and one output shaft and the central axis of a differential gear unit were arranged both parallel to one another and in a main plane of a gear unit casing. The gear unit casing was divided, in a dividing plane which is located perpendicular to the axes of rotation, into a gear wheel casing which accommodated all the gear wheel stages for forming the gear unit speeds and partially accommodated the differential gear unit, and into an adaptor casing which completely accommodates a separating or starting clutch and partially accommodates the differential gear unit. Seated both on the input shaft and on the output shaft were loose wheels of gear wheel stages for forming forward gears which were activated via three shift rods located parallel to one another and also to the transmission shafts and are arranged on one side of the main plane. On the other side of the main plane, a bearing bolt for the rotatable bearing of intermediate gear wheels of a gear wheel stage was arranged parallel to the input shaft in order to form the reverse gear. The bearing bolt could be inserted by one end into a receptacle hole of the gear wheel casing and by its other end into a receptacle hole of the adaptor casing. The receptacle hole of the adaptor casing opened in a dividing surface located in the dividing plane.

An object of the present invention is to use as few different types of parts as possible while providing a change gear unit which has at least five forward gears and one synchronized reverse gear.

This object has been advantageously achieved in accordance with the present invention by providing that the intermediate gear wheel is arranged to mesh continuously with the input-side gear wheel, which is rotationally fixed with respect to the input shaft, of the gear wheel stage having the largest transmission ratio of three gear wheel stages whose transmission ratios form a succession and which forms the forward gears as the drive connection between the input shaft and the output shaft. The output-side gear wheel of the gear wheel stage forms the reverse gear as a drive connection between the input shaft and the output shaft. The two output-side gear wheels of that gear wheel stage having the smallest transmission ratio of the three gear wheel stages whose transmission ratios form the succession and which form forward gears as a drive connection between the input shaft and the output shaft, and of the gear wheel stage which forms the reverse gear as a drive connection between the input shaft and the output shaft, are arranged rotatably and axially adjacent to one another on the output shaft and are coupleable to the output shaft.

In the change gear unit according to the present invention, the reverse gear is synchronized, and a particular input-side gear wheel for the gear wheel stage for forming the reverse gear is dispensed with. The input shaft can be manufactured in one piece with the three gear wheels of the gear wheel stages in order to form five or six forward gears. In one embodiment of the present invention, these three gear wheel stages require, together with the gear wheel stage forming the reverse gear, only two clutches for the respective engagement, as a drive connection between the input shaft and output shaft.

In another embodiment of the gear change unit according to the present invention, all the gear wheels of the input shaft can be manufactured with the gear-cutting method by providing, inter alia, that the output-side gear wheel of the gear wheel stage having the smallest transmission ratio of the three gear wheel stages, whose transmission ratios form a succession and form the forward gears as a drive connection between the input shaft and the output shaft, is arranged axially between the output-side gear wheel of the gear wheel stage which forms the reverse gear as a drive connection between the input shaft and the output shaft, and also between the input-side gear wheels of the gear wheel stages constituting a drive connection between the output shaft and the differential gear unit.

According to another advantageous feature of the present invention, the change gear unit can be extended to seven or eight forward gears while maintaining the advantages of the five-gear or six-gear embodiment.

An advantageous activation of the clutches of the change gear unit according to the present invention can be achieved by providing that, for example, the clutches operatively associated with the gear wheel stages constituting the drive connection between the input shaft and the output shaft, and the clutches operatively associated with the gear wheel stages constituting the drive connection between the output shaft and differential gear unit, are arranged to be activated by a shift drum having a respective shift fork.

An advantageous refinement of a gear unit casing of the change gear unit according to the present invention is achievable in that a first casing plane of a gear unit casing contains axes of rotation of the input shaft and the output shaft, a second casing plane of the gear unit casing contains an axis of rotation of the output shaft and the central axis of the differential gear unit, and a third casing plane located between the first and second casing planes, contains the axis of rotation of the output shaft and the geometric axis of a bearing axle, and the shift forks are arranged to be axially displaceable with respect to the associated transmission shaft, with an intermediate connection of the bearing axle.

BRIEF DESCRIPTION OF THE DRAWINGS

Other objects, advantages and novel features of the present invention will become apparent from the following detailed description of the invention when considered in conjunction with the accompanying drawings wherein.

DETAILED DESCRIPTION OF THE DRAWINGS

Referring to the first embodiment in FIGS. 1, 4, 5 and 6, a change gear unit designated generally by numeral 48 has an input shaft 13, a parallel output shaft 14 and a differential gear unit 15 whose central axis 16—16 is parallel to the transmission shafts 13, 14, for a drive axle. The input shaft 13 and output shaft 14 are connected to one another by three gear wheel stages 17, 18, 19 to form forward gears and by one gear wheel stage 22 to form a reverse gear.

The input gear wheel 41, arranged rotationally fixed with respect to the input shaft 13, of the gear wheel stage 17 which has the highest transmission ratio of the three gear wheel stages 17, 18, 19 meshes not only with the output-side gear wheel 37, associated with this gear wheel stage 17, on the output shaft 14, but also with the intermediate gear wheel 44 of the gear wheel stage 22. The intermediate gear wheel 44 which transmits the reversal of the rotational direction, is mounted in an independently rotatable fashion and itself meshes with the output-side gear wheel 40 of the gear wheel stage 22 on the output shaft 14.

The input-side gear wheel 29 of the gear wheel stage 19 which has the lowest transmission ratio of the three gear wheel stages 17, 18, 19 is arranged rotationally fixed with respect to the input shaft 13 and meshes with a gear wheel 39 which is rotatably mounted on the output shaft 14 and can be optionally coupled to the output shaft 14 with the adjacent output-side gear wheel 40 of the gear wheel stage 22 via a clutch 31.

The gear wheel stage 19 is arranged axially between the input-side gear wheel 41 and the differential gear unit 15. The gear wheel stage 18 which has the middle transmission ratio of the three gear wheel stages 17, 18, 19 is located at the opposite end of the input shaft 13 to the differential gear unit 15. The input-side gear wheel 28 of the gear wheel stage 18 is seated rotationally fixed on the input shaft 13 and meshes with the output-side gear wheel 38 which is rotatably mounted on the output shaft 14. The gear wheel 38 is connected, together with the adjacent output-side gear wheel 37 of the gear wheel stage 17, to the output shaft 14 by a clutch 42.

The input-side gear wheels 28, 29 and 41 of the gear wheel stages 17, 18, 19 and 22 are constructed in one piece with the input shaft and manufactured with a known gear-cutting method. This manufacturing method is more advantageous than a jointing method and is made possible by the novel and inventive arrangement of the two gear wheels 28, 29 relative to the gear wheel 41, and the particularly advantageous construction of the gear wheels and input shaft in one piece.

The differential gear unit 15 has, in the conventional manner, a rotating differential gear unit casing 24 which secures the bearing bolt of the revolving bevel gears and forms the input-side gear unit element and is connected to the output shaft 14 by two gear wheels stages 23, 25. The input-side gear wheels 27, 34 of the respective two gear wheel stages 23, 25 are rotatably mounted on the output shaft 14 and connected to the differential shaft 14 by a clutch 26. The differential gear unit bevel gears 46, 47, which are central with respect to the central axis 16—16, can be coupled in a known way to one vehicle wheel each by joints.

Figure 2:
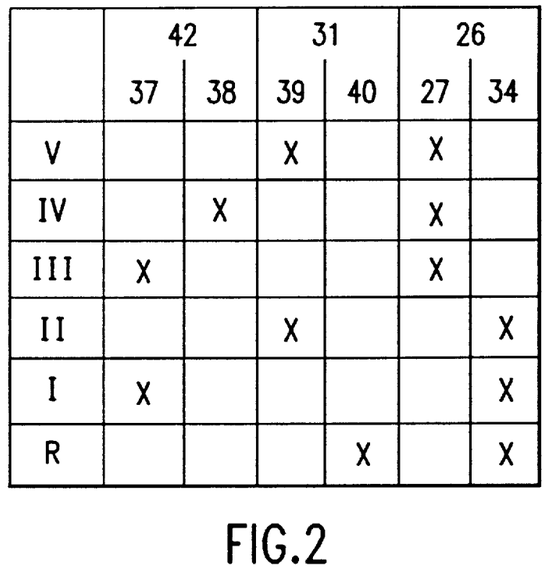
FIG. 2 is a table of the gear wheel stages or clutches which act in the individual speeds, in the first embodiment of the change gear unit of FIG. 1 has five forward gears.

According to the table in FIG. 2, the change gear unit 48 can operate as a five-speed gear unit in which a progressive gradation of the gears is produced by the fact that the middle transmission ratio of the gear wheel stage 18, in conjunction with the gear wheel stage 25 which has the higher transmission ratio of the two gear wheel stages 23, 25 is not used between the first and the third gear. The power flux in the five forward gears I to V and in the reverse gear R, shown in FIG. 2 is self-explanatory to one skilled in the art.

Figure 3:
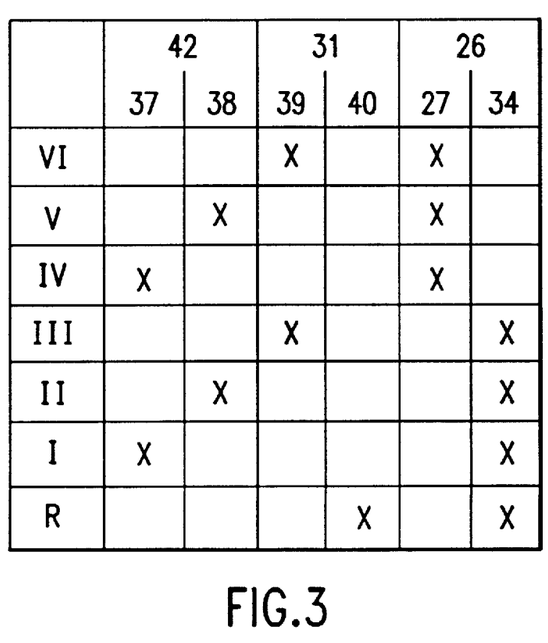
FIG. 3 is a table of the gear wheel stages or clutches which act in the individual speeds, in the first embodiment of the change gear unit of FIG. 1 has six forward gears.

According to the table in FIG. 3, the change gear unit 48 can operate as a six-speed gear unit, because here the middle transmission ratio of the gear wheel stage 18 is used in conjunction with the gear wheel stage 25 of the differential gear unit 15 to form the second gear. The power flux in the six forward gears I to VI and in the reverse gear R of this table is also self-explanatory.

Figure 7:
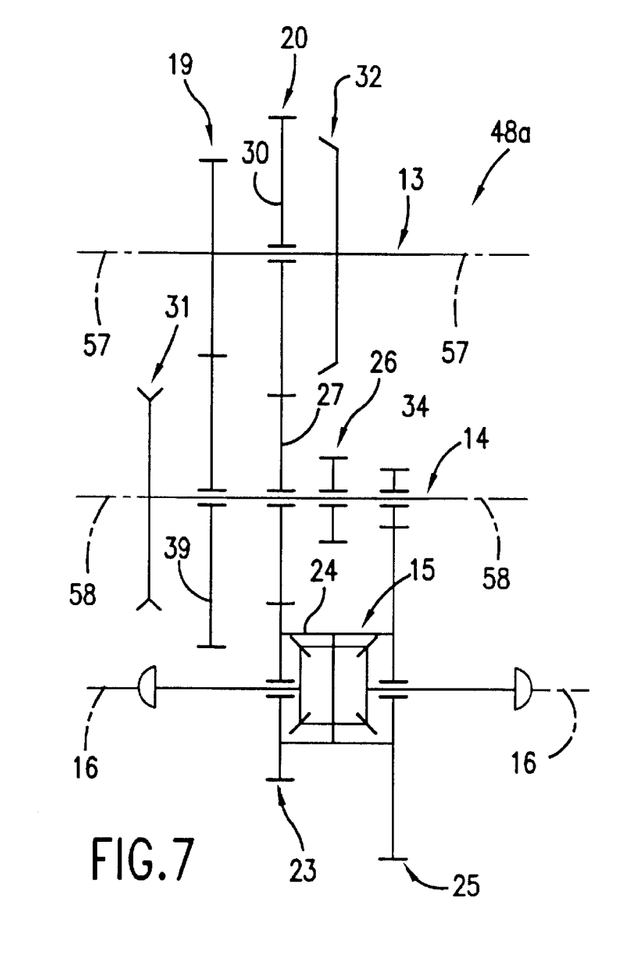
FIG. 7 is a schematic drawing of a gearing outline of a change gear unit according to a second embodiment of the present invention.

In the embodiment of the change gear unit 48a in FIG. 7, an additional seventh gear is formed by an input-side gear wheel 30 of an additional gear wheel stage 20 being rotatably mounted on the input shaft 13 and coupled to the input shaft 13 by a clutch 32. This additional fourth gear wheel stage 20, which uses the input-side gear wheel 27 of the gear wheel stage 23 of the differential gear unit 15 as its output-side gear wheel, has the lowest transmission ratio of all four gear wheel stages 17 to 20. The change gear unit 48a is in other material respects identical to the embodiment 48 in FIG. 1.

Figure 7A:
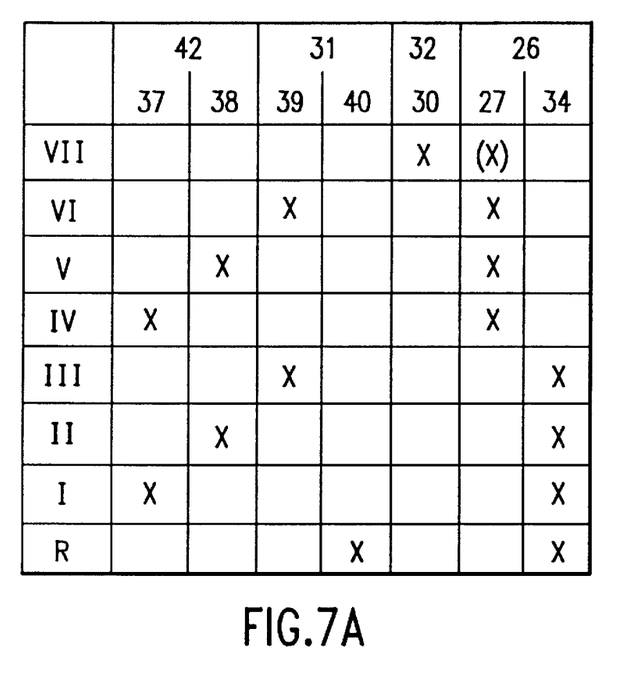
FIG. 7a is a table of the gear wheel stages or clutches which act in the individual speeds, in the second embodiment of the change gear unit of FIG. 7 has seven forward gears.

The transmission ratio of the seventh gear in change gear 48a is then obtained in accordance with the table in FIG. 7a by multiplicative combination of the transmission ratio of the additional gear wheel stage 20 with the gear wheel stage 23. That is, the seventh gear has the lower transmission ratio of the two gear wheel stages 23, 25, of the differential gear unit 15. The clutch 32 of the gear wheel 30 is engaged and the clutch 26 is able to, but does not have to, connect the gear wheel 27 to the output shaft 14. The other forward gears I to VI and the reverse gear R are identical to the corresponding gears of the embodiment 48 in accordance with the table in FIG. 3.

Figure 1:
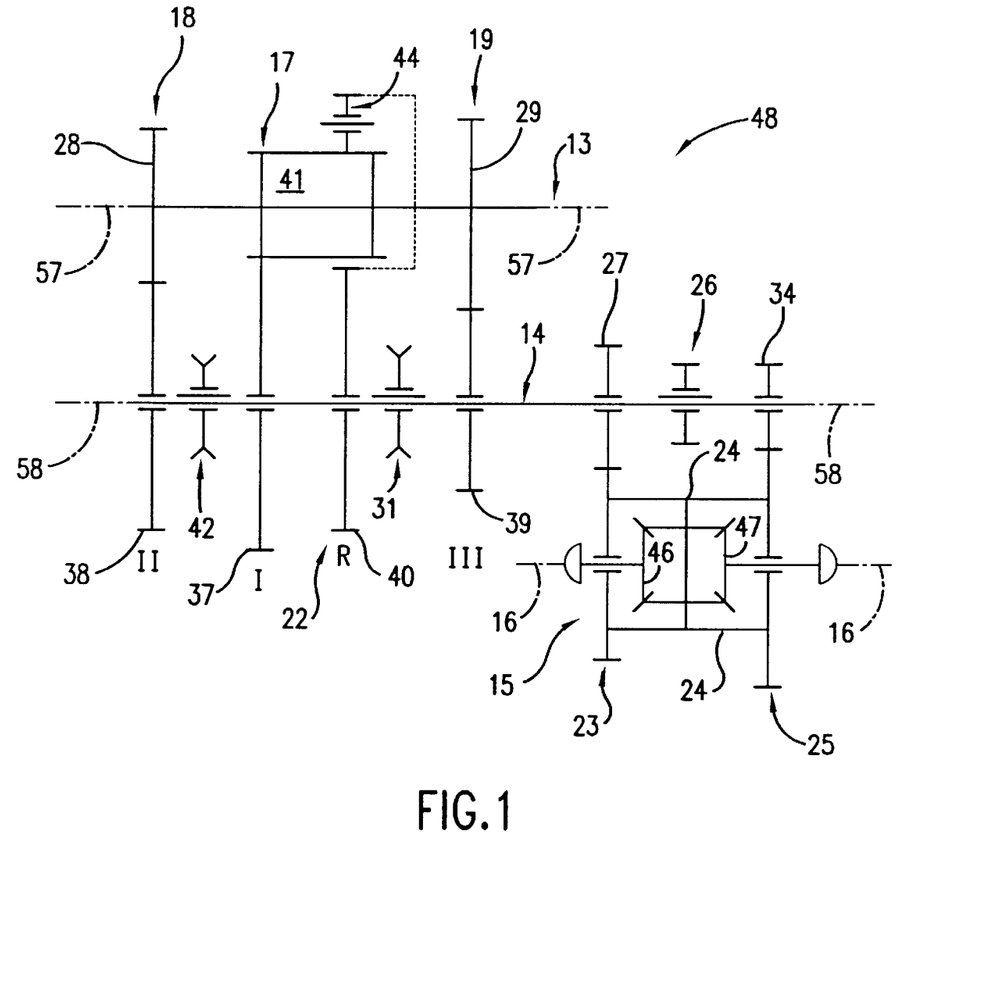
FIG. 1 is a schematic drawing of a gearing outline of a change gear unit according to a first embodiment of the present invention with five or six forward gears.
Figure 8:
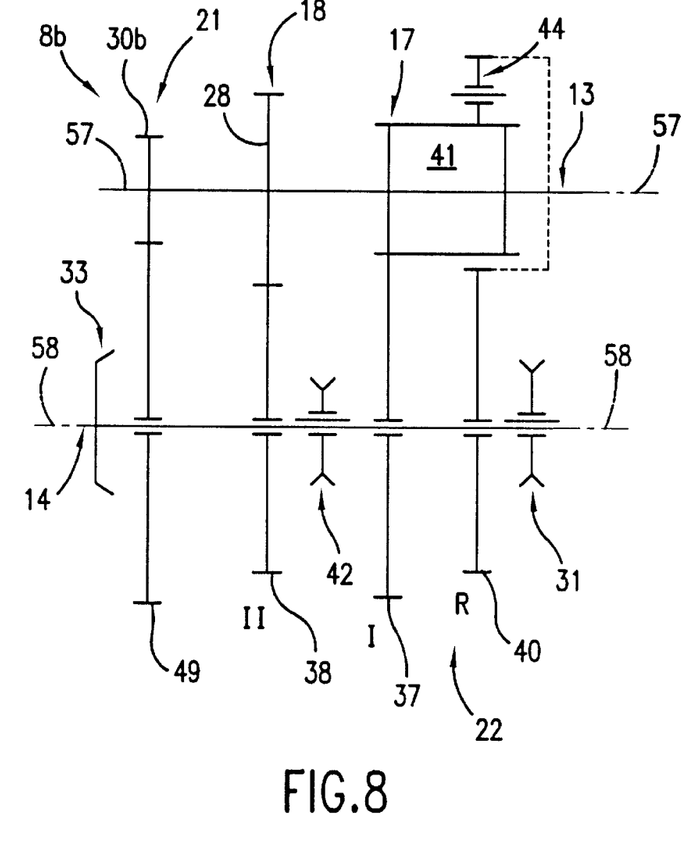
FIG. 8 is a schematic drawing of a gearing outline of a change gear unit according to a third embodiment of the present invention.

In the change gear unit 48b in the embodiment shown in FIG. 8, a speed which is additional to the six-speed gear unit 48 in FIG. 1 is formed in that an additional fourth gear wheel stage 21 is arranged at the opposite end of the input shaft 13 to the differential gear unit 15. The gear wheel stage 21 has the highest transmission ratio of all four gear wheel stages 17, 18, 19 and 21, but the change gear unit 48b in FIG. 8 is in other material respects identical to the embodiment 48 in FIG. 1. The gear wheel 30b, seated rotationally fixed on the input shaft 13, meshes with the associated output gear wheel 49 which is rotatably mounted on the output shaft 14 and is connected to the output shaft 14 by a clutch 33 which can be engaged and disengaged.

Figure 8A:
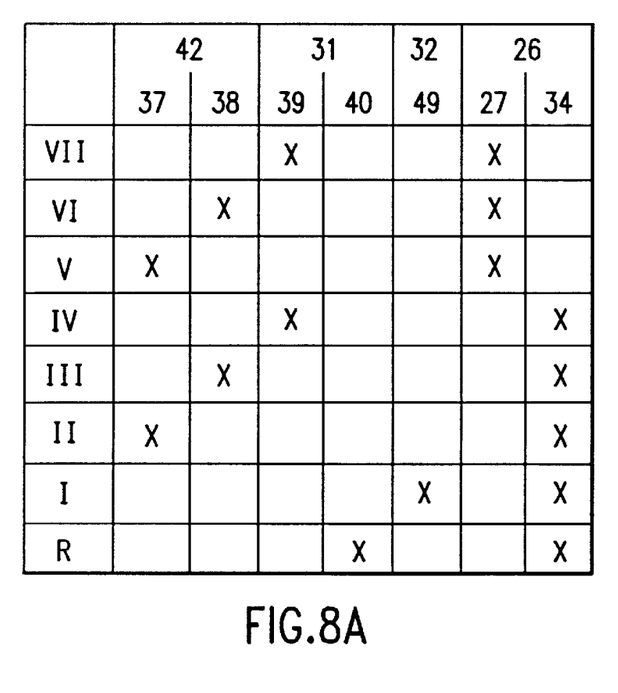
FIG. 8a is a table of the gear wheel stages or clutches which act in the individual speeds, in the embodiment of the change gear unit of FIG. 8 with seven forward gears.

The formation of gears II to VII and of the reverse gear R in the change gear unit 48b is identical to that of gears I to VI and R in the table in FIG. 3 for the change gear unit 48 in FIG. 1. In the change gear unit 48b, however, an additional gear, here the first gear, is formed by combining the highest transmission ratio of the gear wheel stage 21 with the higher of the two transmission ratios of the gear wheel stages 23, 25. That is, the gear wheel stage 25 is shown in the table in FIG. 8a, which table is again self-explanatory in terms of the power flux in the individual speeds.

Figure 4:
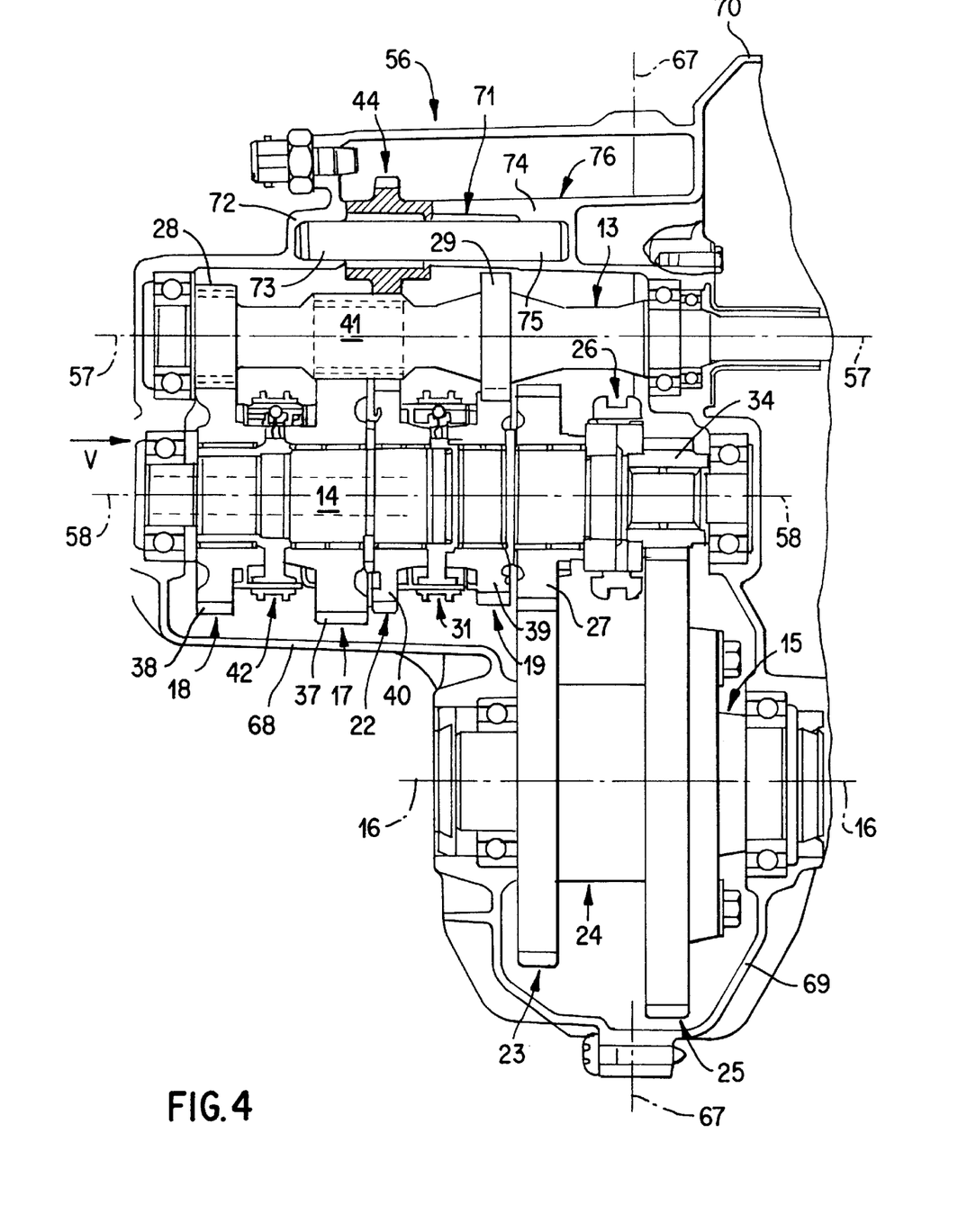
FIG. 4 is a more detailed illustration of the change gear unit of FIG. 1 along line IV—IV in FIG. 5.
Figure 5:
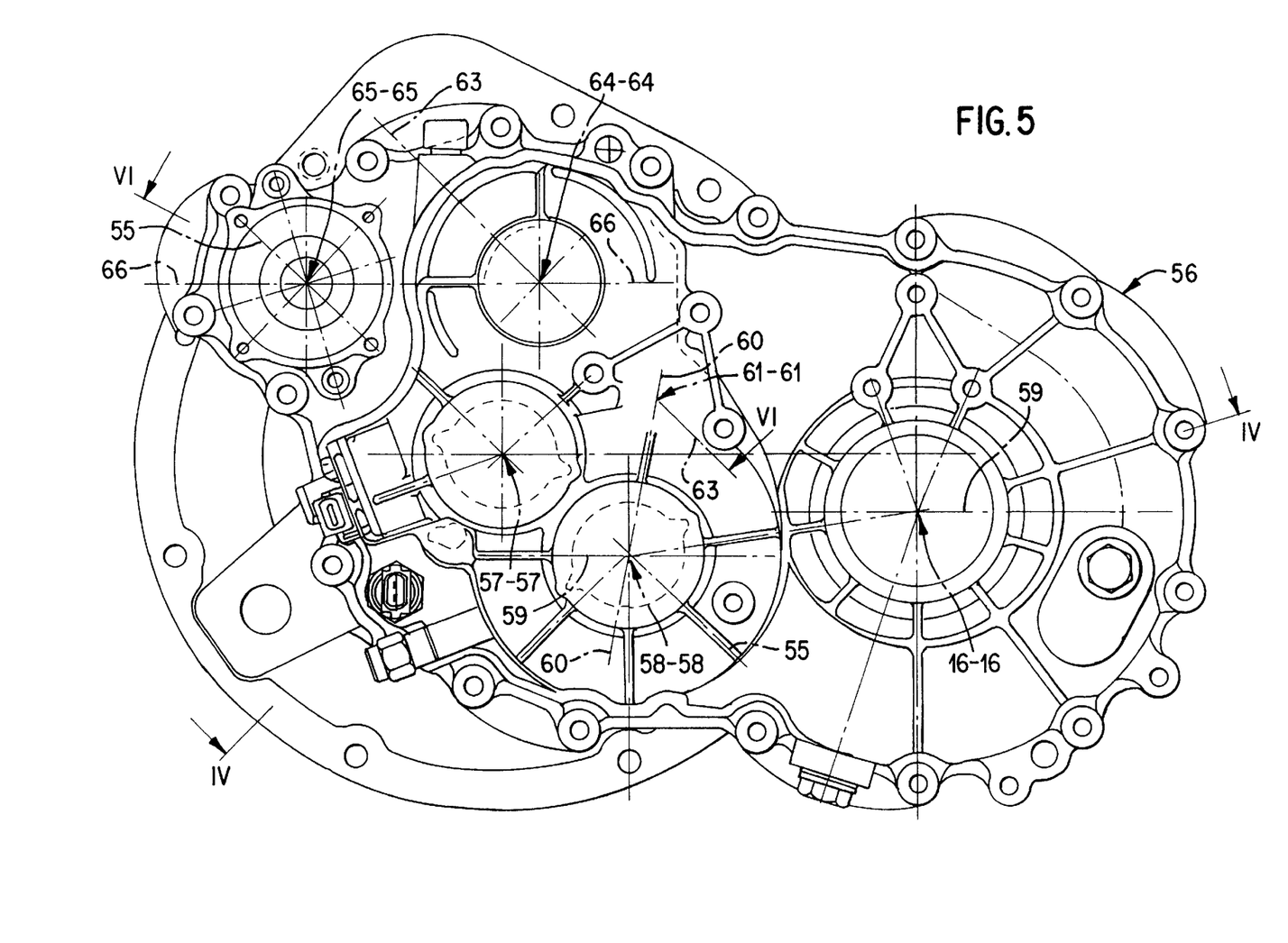
FIG. 5 is a side view of the change gear unit in FIG. 4, viewed in the direction of the arrow V.
Figure 6:
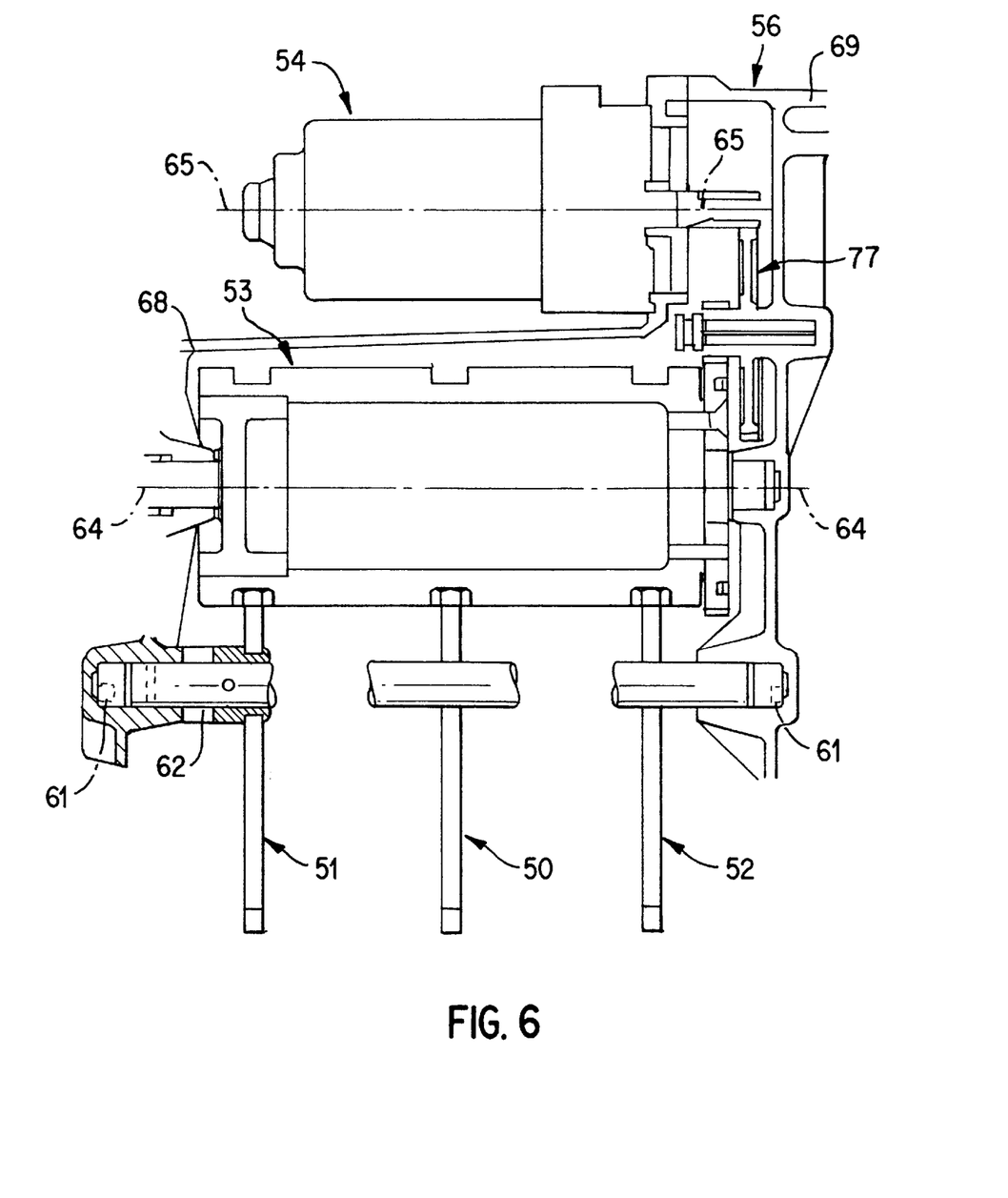
FIG. 6 is a further longitudinal section through the change gear unit in FIG. 4 along line VI—VI in FIG. 5.

In constructional terms, the gear change unit 48 in FIGS. 4 to 6 may be such that a gear unit casing 56 has a first significant casing plane 55—55 which contains the parallel rotation axes 57—57 and 58—58 of the input shaft 13 and output shaft 14. The gear unit casing 56 has a second significant casing plane 59—59 which contains the rotation axis 58—58 of the output shaft 14 and the central axis 16—16 of the differential gear unit 15 and encloses an obtuse angle with the first casing plane 55—55. The gear unit casing 56 has a third significant casing plane 60—60 which is located between the first and second casing planes and contains the rotation axis 58—58 of the output shaft 14 and the geometric axis 61—61, which is parallel to the rotation axis 58—58, of a bearing axis 62—62.

Arranged on the bearing axis 62 are a shift fork 51, which is in engagement with the sliding sleeve of the clutch 42, a shift fork 50, which is in engagement with the sliding sleeve of the clutch 31, and a shift fork 52, which is in engagement with the sliding sleeve of the clutch 26. They are arranged so that the shift forks 50, 51, 52 can be displaced relative to the output shaft 14, parallel to its axis, by activating a shift drum 53.

The gear unit casing 56 has a fourth significant casing plane 63—63 which is located approximately parallel to the first casing plane 55—55 and contains the geometric axis 61—61 of the bearing axis 62 as well as the axis of rotation 64—64, which is parallel to the geometric axis 61—61, of the shift drum 53.

The gear unit casing 56 has a fifth significant casing plane 66—66 which, in the installation position, is arranged approximately horizontally and contains the rotation axis 64—64 of the shift drum 53 and the rotation axis 65—65, which is parallel to the axis of rotation 64—64, of a stepping motor 54 which drives the shift drum 53 via a gear wheel stage 77. The rotation axis 65—65 of the stepping motor 54 is also located in the first casing plane 55—55 so that the rotation axis 57—57 of the input shaft 13 is located between the rotation axes 58—58 and 65—65.

The gear unit casing 56 is divided in a dividing plane 67—67, located perpendicularly with respect to the transmission shafts 13, 14 and approximately centrally with respect to the differential gear unit 15, into a gear wheel casing 68 which accommodates the gear wheel stages 17, 18, 19 and 22 completely and the transmission shafts 13, 14 and the differential gear unit 15 partially, and into an adapter casing 69 which is constructed in one piece with a clutch bell 70 for accommodating a starting clutch.

The intermediate gear wheel 44 of the gear wheel stage 22 for the reverse gear is independently rotatably mounted on a bearing bolt 71 which is parallel to the input shaft 13 and whose bolt ends 73, 75 are fixed in each case one corresponding receptacle 72, 74 of the gear wheel casing 68 and of the adaptor casing 69. The receptacle 74 is located in a bracket 76 which is constructed in one piece with the adaptor casing 69 and extends in the longitudinal direction of the input shaft 13 beyond the dividing plane 67—67 into the gear wheel casing 68.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A change gear unit for a motor vehicle, comprising an input shaft, an output shaft optionally movable into a drive connection with the input shaft, at least three gear wheel stages operatively arranged between the input shaft and the output shaft to form forward gears and by one gear wheel stage operatively arranged therebetween to form a reverse gear, an input-side gear unit element of a planetary gear-type three-element differential gear unit arranged, with respect to a central axis thereof, parallel to the input shaft and output shaft, two gear wheel stages, and two output-side gear unit elements of the differential gear unit which are central to the central axis each adapted to be coupled to a respective wheel of a vehicle drive axle, two input-side gear wheels of two gear wheel stages are configured to form forward gears as a drive connection between the input shaft and the output shaft, an input-side gear wheel of the gear wheel stage configured to form the reverse gear as a drive connection between the input shaft and output shaft are fixedly rotationally arranged relative to the input shaft, and an intermediate gear wheel is independently rotatably mounted and arranged to be movable into meshing engagement both with the input-side gear wheel and with the output-side gear wheel of the gear wheel stage forming the reverse gear as a drive connection between the input shaft and output shaft, wherein the intermediate gear wheel is arranged to mesh continuously with the input-side gear wheel, which is rotationally fixed with respect to the input shaft, of the gear wheel stage having the largest transmission ratio of three gear wheel stages whose transmission ratios form a succession and which forms the forward gears as the drive connection between the input shaft and the output shaft, and the output-side gear wheel of the gear wheel stage which forms the reverse gear as a drive connection between the input shaft and the output shaft, and the two output-side gear wheels of that gear wheel stage, which has the smallest transmission ratio of the three gear wheel stages whose transmission ratios form the succession and which form forward gears as a drive connection between the input shaft and the output shaft, and of the gear wheel stage which forms the reverse gear as a drive connection between the input shaft and the output shaft, are arranged rotatably and axially adjacent to one another on the output shaft and are coupleable to the output shaft.

2. The change gear unit according to claim 1, wherein the two output-side gear wheels of the gear wheel stage having the smallest transmission ratio of the three gear wheel stages whose transmission ratios form a succession and forms the forward gears as a drive connection between the input shaft and the output shaft and of the gear wheel stage, which forms the reverse gear as a drive connection between the input shaft and the output shaft, are arranged rotatably and axially adjacent to one another on the output shaft and are coupleable to the output shaft.

3. The change gear unit according to claim 1, wherein the output-side gear wheel of the gear wheel stage having the smallest transmission ratio of the three gear wheel stages, whose transmission ratios form a succession and form the forward gears as a drive connection between the input shaft and the output shaft, is arranged axially between the output-side gear wheel of the gear wheel stage which forms the reverse gear as a drive connection between the input shaft and the output shaft, and also between the input-side gear wheels of the gear wheel stages constituting a drive connection between the output shaft and the differential gear unit.

4. The change gear unit according to claim 3, wherein the two output-side gear wheels of the gear wheel stage having the smallest transmission ratio of the three gear wheel stages whose transmission ratios form a succession and forms the forward gears as a drive connection between the input shaft and the output shaft and of the gear wheel stage, which forms the reverse gear as a drive connection between the input shaft and the output shaft, are arranged rotatably and axially adjacent to one another on the output shaft and are coupleable to the output shaft.

5. The change gear unit according to claim 1, wherein the input-side gear wheel of the gear wheel stage having a middle transmission ratio of the three gear wheel stages, whose transmission ratios form a succession and which form the forward gears as the drive connection between the input shaft and the output shaft, is arranged axially directly adjacent the input-side gear wheel, with respect to an end side thereof facing away from the differential gear unit, of the gear wheel stage having the largest transmission ratio of the three gear wheel stages.

6. The change gear unit according to claim 5, wherein the two output-side gear wheels of the respective gear wheel stages having the largest transmission ratio and the middle transmission ratio of the three gear wheel stages are connected to a clutch.

7. The change gear unit according to claim 6, wherein a fourth gear wheel stage also forms the forward gears as a drive connection between the input shaft and the output shaft and has the smallest or largest transmission ratio of the four gear wheel stages.

8. The change gear unit according to claim 7, wherein the input-side gear wheel of the gear wheel stage having the smallest transmission ratio of the four gear wheel stages are optionally coupled to the input shaft and arranged to continuously mesh with the input-side gear wheel of one of the gear wheel stages constituting a drive connection between the output shaft and the differential gear unit.

9. The change gear unit according to claim 8, wherein the input-side gear wheel of the gear wheel stage having the smallest transmission ratio of the four gear wheel stages is coupled independently to a clutch.

10. The change gear unit according to claim 7, wherein the input-side gear wheel of the gear wheel stage having the largest transmission ratio of the four gear wheel stages is arranged at an opposite end of the input shaft to the differential gear unit, and the associated output-side gear wheel is arranged to be optionally coupled to the output shaft.

11. The change gear unit according to claim 10, wherein the output-side gear wheel of the gear wheel stage having the largest transmission ratio of the four gear wheel stages is arranged to be independently coupled to a clutch.

12. The change gear unit according to claim 1, wherein the clutches operatively associated with the gear wheel stages constituting the drive connection between the input shaft and the output shaft, and the clutches operatively associated with the gear wheel stages constituting the drive connection between the output shaft and differential gear unit, are arranged to be activated by a shift drum having a respective shift fork.

13. The change gear unit according to claim 12, wherein a stepping motor is arranged to drive the shift drum.

14. The change gear unit according to claim 12, wherein a first casing plane of a gear unit casing contains axes of rotation of the input shaft and the output shaft, a second casing plane of the gear unit casing contains an axis of rotation of the output shaft and the central axis of the differential gear unit, and a third casing plane located between the first and second casing planes, contains the axis of rotation of the output shaft and the geometric axis of a bearing axle, and the shift forks are arranged to be axially displaceable with respect to the associated transmission shaft, with an intermediate connection of the bearing axle.

15. The change gear unit according to claim 14, wherein a fourth casing plane, located substantially parallel to the first casing plane, contains the geometric axis of the bearing axle for the shift forks and an axis of rotation of the shift drum.

16. The change gear unit according to claim 13, wherein the first casing plane additionally contains an axis of rotation of the stepping motor, and the axis of rotation of the input shaft is located between the axes of rotation of the output shaft and the stepping motor, and a fifth casing plane, located approximately horizontally in the installation position, contains the axes of rotation of the shift drum and the stepping motor.

17. The change gear unit according to claim 1, wherein the gear unit casing is, in a dividing plane which is perpendicular to the transmission shafts, divided, on one hand, into a gear wheel casing which completely accommodates the gear wheel stages constituting the drive connection between the input shaft and the output shaft and partially accommodates the differential gear unit, and, on the other hand, into an adaptor casing configured to be joined on by flanges and having a one-piece clutch bell, for accommodating a starting clutch; a bearing bolt, arranged parallel to the input shaft, for the intermediate gear wheel is mounted in the gear unit casing; the gear wheel casing has a receptacle for securing one bolt end of the bearing bolt; and the adaptor casing has a receptacle for securing another bolt end of the bearing bolt, and the adaptor casing has a bracket which projects in a longitudinal direction of the bearing bolt beyond the dividing plane into the gear wheel casing and is provided with the receptacle.

* * * * *